United States Patent [19]

Foreau et al.

[11] Patent Number: 4,915,324
[45] Date of Patent: Apr. 10, 1990

[54] AUXILLARY ROLLING SYSTEM FOR AIRCRAFT

[75] Inventors: Bernard Foreau, Blagnac; Alain Pichon, Tournefeuille; Claude Nazair-Blanc, Toulouse, all of France

[73] Assignee: Aerospatiale Societe Nationale Industrielle, Paris, France

[21] Appl. No.: 183,230

[22] Filed: Apr. 19, 1988

[30] Foreign Application Priority Data

Apr. 24, 1987 [GB] United Kingdom ............... 8705835

[51] Int. Cl.$^4$ .............................................. B64C 25/10
[52] U.S. Cl. ............................. 244/102 R; 244/100 R
[58] Field of Search ......... 244/100 R, 102 R, 102 SS, 244/104 R, 104 FP

[56] References Cited

U.S. PATENT DOCUMENTS

| 15,688 | 9/1923 | Caproni. | |
|---|---|---|---|
| 1,753,938 | 4/1930 | Petrunin. | |
| 2,294,918 | 9/1942 | Levy | 244/102 SS |
| 2,448,064 | 8/1948 | Wallace | 244/102 R |
| 2,732,152 | 1/1956 | Neillson et al. | 244/104 |

FOREIGN PATENT DOCUMENTS

| 1239949 | 5/1967 | Fed. Rep. of Germany | 244/104 FP |
|---|---|---|---|
| 970181 | 1/1951 | France | 244/102 R |

Primary Examiner—Galen Barefoot
Attorney, Agent, or Firm—Fisher, Christen & Sabol

[57] ABSTRACT

This invention relates to a rolling system for aircraft, comprising telescopic landing gears which abut on the ground via wheels and which present a variable length as a function of the load applied thereto by said aircraft. According to the invention, this system comprises at least one jack assembly capable of outwardly pressing at least one rolling member with a constant force and said rolling member is placed in contact with the ground only after impact of the telescopic landing gears and when the length of said telescopic landing gears corresponds to a predetermined load threshold applied thereto, said threshold being less than the load corresponding to take-off.

8 Claims, 6 Drawing Sheets

AUXILLARY ROLLING SYSTEM FOR AIRCRAFT

The present invention relates to a rolling system for aircraft.

It is known that the rolling system of an aircraft, particularly of a jumbo-jet aircraft, comprises a plurality of landing gears, of which the number and structure depend both on the dynamic characteristics of the aircraft on the ground and the characteristics of the runways of the aerodromes. International regulations define a coefficient associated with a type of aircraft and called ACN number (aircraft classification number) and a coefficient associated with a runway and called PCN number (pavement classification number), and, in order to avoid excessive damage to a runway, care is taken that the aircraft which land there or take off present an ACN number which is lower than the PCN number of said runway.

When it is envisaged that a jumbo-jet aircraft will use a runway of low resistance, it is indispensable to provide numerous landing gears.

If the landing gears are to support the same efforts and to perform the same functions, they present identical complex structures, with elastic system and shock-absorbing system, and they require reinforcements of the structure of the aircraft at each of the points thereof to which they are connected. This results in a considerable increase in the mass and cost of the aircraft. Moreover, it is generally necessary to provide a system for distributing effort between these numerous landing gears, in order to allow compensation of the unevenness of the runway. This results in an additional increase in mass and cost.

It is an object of the present invention to overcome these drawbacks.

To that end, according to the invention, the rolling system for aircraft, comprising telescopic landing gears which abut on the ground via wheels and which present a variable length as a function of the load which is applied thereto by said aircraft, is noteworthy in that it comprises at least one jack assembly capable of outwardly pressing at least one rolling member having a constant force and in that said jack assembly is capable of communicating to said rolling member at least two relative positions of retraction with respect to the wheels of said telescopic landing gears, the first of these positions being such that said rolling member is maintained spaced apart from the ground whatever the compression of said telescopic landing gears under the load that is applied thereto by the aircraft, whilst the second of said positions is such that said rolling member is placed in contact with the ground when the length of said telescopic landing gears corresponds to a predetermined load threshold applied thereto, said threshold being less than the load corresponding to take-off. Said threshold is preferably also less than the load corresponding to taxiing on the ground after landing.

Thanks to the present invention, said jack assembly and its rolling member may thus act as auxiliary landing gear only during taxiing before take-off, take-off and, possibly but advantageously, taxiing after landing. In fact, said first position may be used when the aircraft makes contact with the ground during landing, whilst the second may be used for taxiing.

The invention is based on the observation that the load applied by an aircraft on its rolling system varies considerably as a function of the rolling configuration.

In fact, at the moment of landing (impact), the lift of the aircraft is still considerable, with the result that the load applied on the landing gears is relatively moderate. On the other hand, on taxiing and especially on take-off, at the moment of rotation in particular, the load applied to the landing gears is much greater (almost double).

Since, according to the present invention, the auxiliary landing gear or gears do not intervene at the moment of landing, there is no reason for them to be designed identically to the principal landing gears, with elastic system and shock-absorbing system. The structure of the auxiliary landing gear or gears according to the invention may therefore be simplified and lightened. Moreover, since the role of this or these auxiliary landing gears is to reduce the damage suffered by the runways by limiting the maximum load applied to the principal landing gears, they allow a reduction in dimensions thereof. In addition, they may be of simple and light structure and be functionally independent of the principal landing gears, since they do not participate in landing and they support an effort limited to a preestablished value. In addition, for this latter reason, it is not necessary to provide on the structure of the aircraft, at the points where they are connected thereto, reinforcements as great as those provided for the principal landing gears.

Said jack assembly provided with its rolling member preferably forms a leg which may be articulated beneath the fuselage or beneath the wing of the aircraft and which may occupy either a retracted position within said fuselage or said wings, or an extended, at least substantially vertical position. Furthermore, said leg may take a retracted position and an extended position corresponding respectively to said first and second positions. The retracted position is possibly selected so that, when the aircraft has stopped and is resting on the ground and the leg is in extended position, the rolling member of said leg is spaced apart from the ground, this making it easier to change the tire or tires with which this rolling member is fitted.

The retracted position is preferably essentially used in flight, whether the leg is extended or retracted.

The position of extension of the leg is essentially used in extended position of said leg. In this position of extension, if no load is applied on the landing gears, the lowermost point of the rolling member of said leg lies, above the lowermost point of the wheels of the principal landing gears, at a distance corresponding to the compression of the latter when the predetermined load threshold is applied thereto.

In an advantageous embodiment, said jack assembly comprises:

a jack of which the cavity of the cylinder is provided with a projection separating said cavity into two communicating chambers, one of said chambers containing a piston provided with a rod opposite said projection and hermetically passing through the corresponding bottom of said cylinder;

a first orifice for passage of fluid disposed in the vicinity of said projection and in simultaneous communication with the two communicating chambers;

a second orifice for passage of fluid disposed in said chamber containing said piston, in the vicinity of said corresponding bottom of said cylinder; and a line for supply of hydraulic fluid at constant pressure and a line for return of hydraulic fluid, capable of being alternately connected to said first and second orifices via a valve.

In this way, in retracted position, said piston may be in contact with said projection, whilst, in extended position, said piston is in contact with said corresponding bottom of said cylinder.

Moreover, the hydraulic fluid contained in the other of said chambers, due to its link with the hydraulic circuit of the aircraft, presents a certain function of elasticity, during taxiing of the rolling member of the leg on the ground.

In order to reinforce this function of elasticity still further, it is advantageous if, in this other chamber of the cylinder, there is disposed a floating piston defining, between itself and the bottom of the cylinder opposite said bottom traversed by said piston rod, a tight enclosure which contains an elastically compressible fluid, for example air.

In order to avoid a possible excess pressure in the cylinder of the jack, particularly in the event of rapid variation of the state of said leg, a relief valve is advantageously provided between said first orifice for passage of fluid and said fluid return line.

The invention will be more readily understood on reading the following description with reference to the accompanying drawings, in which.

The diagrams of FIG. 10 illustrate a preferred operating mode of the rolling system according to the invention.

Figure 1:
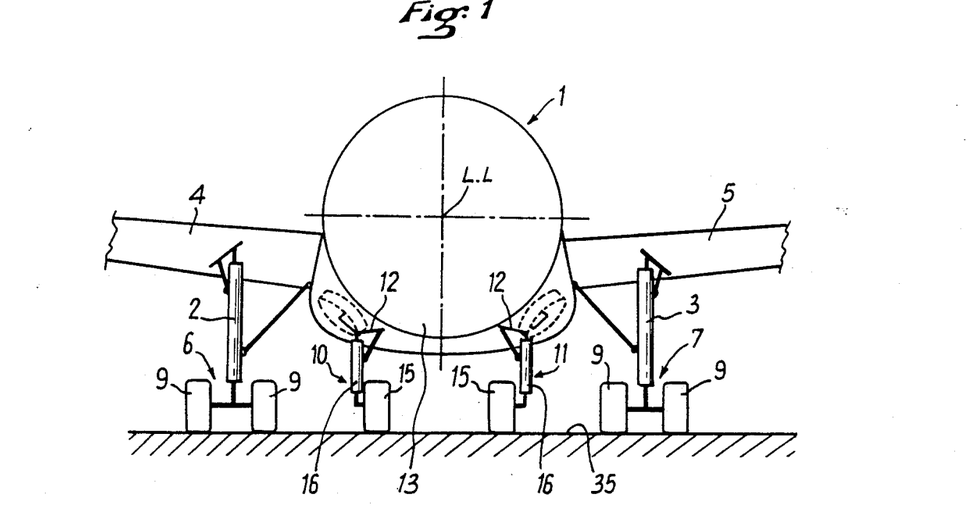
FIGS. 1 and 2 schematically and partially illustrate an aircraft provided with legs according to the present invention, respectively in front view and in side view.
Figure 2:
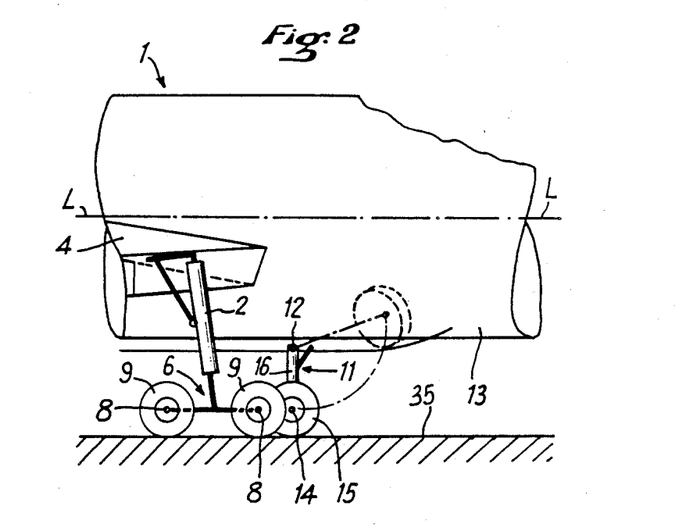

Referring now to the drawings, the aircraft 1, schematically and partially shown in FIGS. 1 and 2, comprises a principal landing gear system constituted by two landing gears 2 and 3 disposed symmetrically with respect to the longitudinal axis L—L of the aircraft and respectively articulated beneath the wings 4 and 5 thereof. The landing gears 2 and 3 present the known general structure of a telescopic shock-absorber and will not be described in detail. It will merely be specified that, likewise in known manner, each landing gear may pass from an extended position (shown in FIGS. 1 and 2) to a position retracted inside the wings (not illustrated) and vice versa and that, at the free end of said landing gears are articulated bogies 6 and 7 provided with wheels 8 equipped with tires 9.

Moreover, the aircraft according to the invention comprises two legs 10 and 11, articulated at 12 in known manner and not shown in detail, beneath the fuselage 13 of the aircraft 1 by one of their ends. At their free end, the legs 10 and 11 bear at least one wheel 14 equipped with a tire 15. Thanks to their articulation 12 on the fuselage 13, and to known actuating means (not shown), the legs 10 and 11 may take either an extended position (shown in solid lines in FIGS. 1 and 2), or a position retracted inside said fuselage 13 (shown in dotted lines in these Figures).

Figure 3:
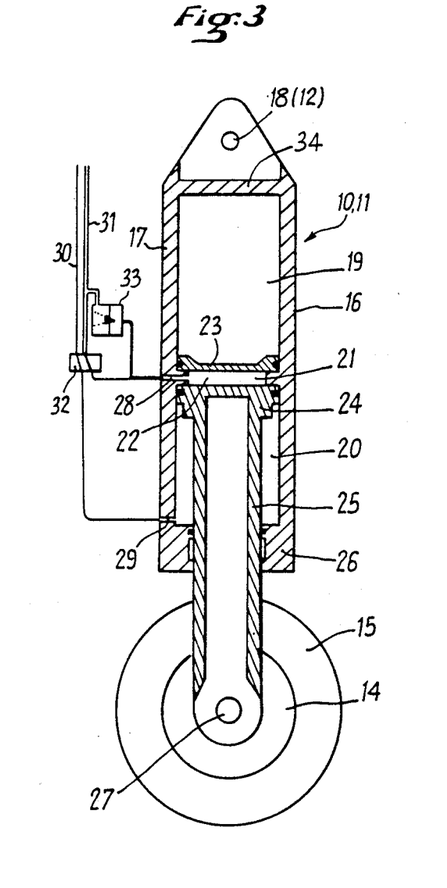
FIGS. 3, 4 and 5 schematically show, in longitudinal section, an embodiment of the legs according to the invention, respectively in retracted position, in extended position and in taxiing or stop position.
Figure 4:
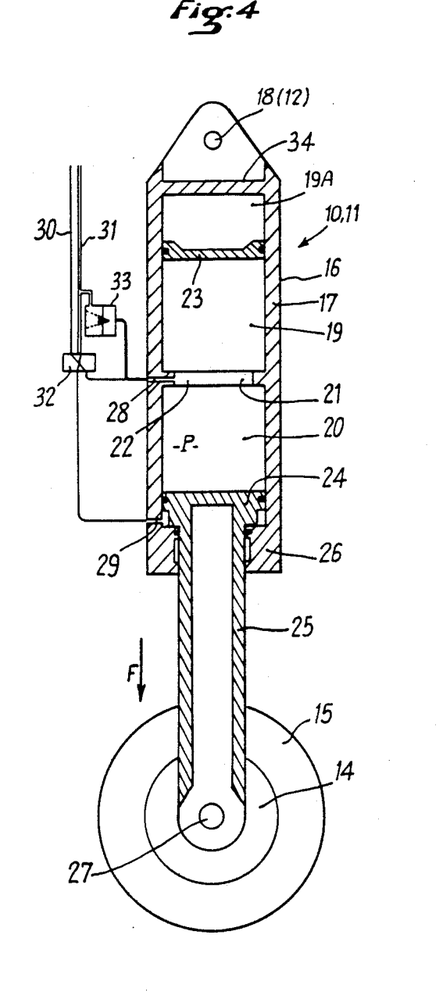

As shown in FIGS. 3 and 4, each leg 10 or 11 is essentially constituted by a jack 16 of which the body 17 comprises at one of its ends a bore 18 allowing articulation (at 12) of the corresponding leg on the fuselage 13.

The internal cavity of the body 17 is divided into two chambers 19 and 20 by an annular rib 21, forming a wide passage of communication 22 between the two chambers 19 and 20.

In chamber 19 which lies near the bore 18 and which is closed by a bottom 34, is disposed a floating piston 23 whilst, in the opposite chamber 20, is disposed a piston 24 whose rod 25 hermetically traverses the bottom 26 of the body 17, opposite the bore 18. The free end of the rod 25, outside said body 17, is provided with a shaft 27, for mounting a wheel 14 in rotation.

In the thickness of the annular separating rib 21 there is provided an orifice 28 for passage of fluid. Moreover, an orifice 29 for passage of fluid is provided in the chamber 20, in the vicinity of the bottom 26. The orifices 28 and 29 are connected to a line 30 for supply of hydraulic fluid at constant pressure and to a line 31 for return of hydraulic fluid, via a valve 32. In addition, a relief valve 33 is mounted between the orifice 28 and the return line 31.

When, as shown in FIG. 3, the valve 32 connects, on the one hand, the orifice 29 with the line 30 for supply under pressure and, on the other hand, the orifice 28 with the return line 31, the piston 24 is pressed by the hydraulic fluid against the annular separating rib 21, whilst piston 23 is applied thereagainst by the pressure of a compressible fluid, for example air, contained in the chamber 19A defined between said floating piston 23 and said bottom 34.

When, on the contrary and as shown in FIG. 4, the valve 32 connects, on the one hand, the orifice 29 with the return line 31 and, on the other hand, the orifice 28 with the pressurized supply line 30, the piston 24 is pushed until it comes into abutment against the bottom 26 (rod 25 then being in position of extension), whilst the floating piston 23 is pushed to a position for which the pressure of the fluid (air) located in that part 19A of the chamber 19 included between said floating piston 23 and the bottom 34, balances the pressure of the hydraulic fluid pushing the floating piston 23.

In this way, it is seen that the piston rod 25 (and therefore the wheel 14 that it bears) may occupy either the retracted position of FIG. 3, or the position of extension of FIG. 4. It is advantageous if the position of extension is used only when the legs 10 and 11 have emerged from the fuselage 13 and if the retracted position is used equally well when the legs 10 and 11 are retracted in the fuselage 13 or extended therefrom. In this way, in extended position of the legs 10, 11 from the fuselage 13, said legs may occupy, as desired, the retracted position of FIG. 3 or the position of extension of FIG. 4.

In this position of extension of FIG. 4, the piston rod 25 is maintained pushed outwardly by a constant force F which is equal to the product of the constant pressure P of the hydraulic fluid, filling the interior space of the body 17 included between the pistons 23 and 24, by the section S of said piston 24.

Figure 5:
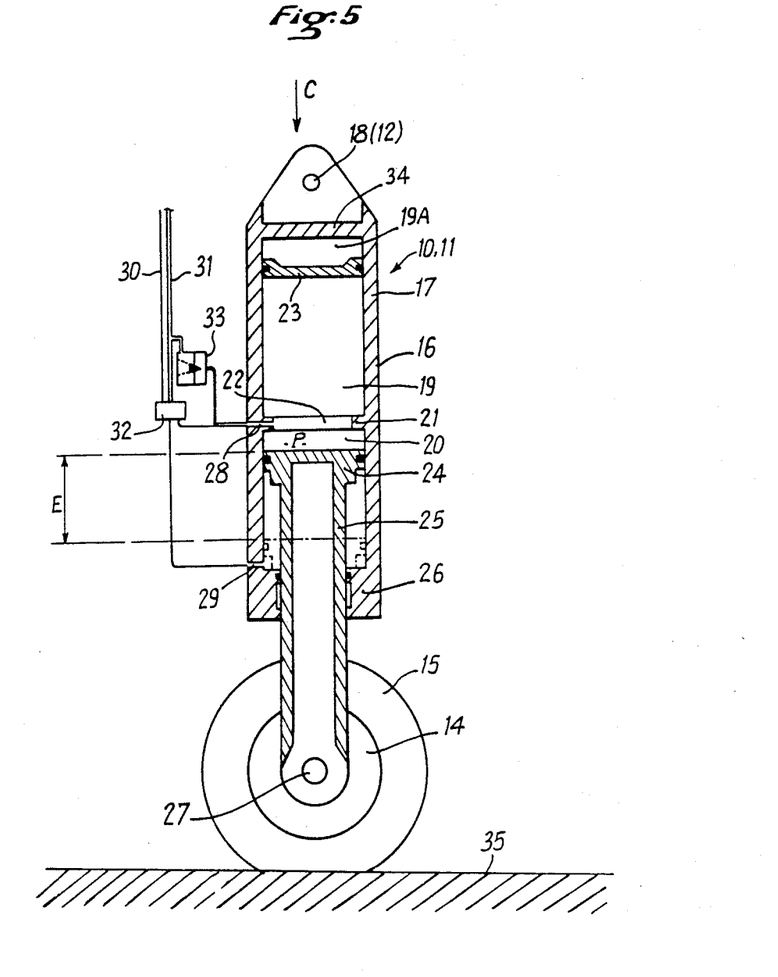
Figure 6:
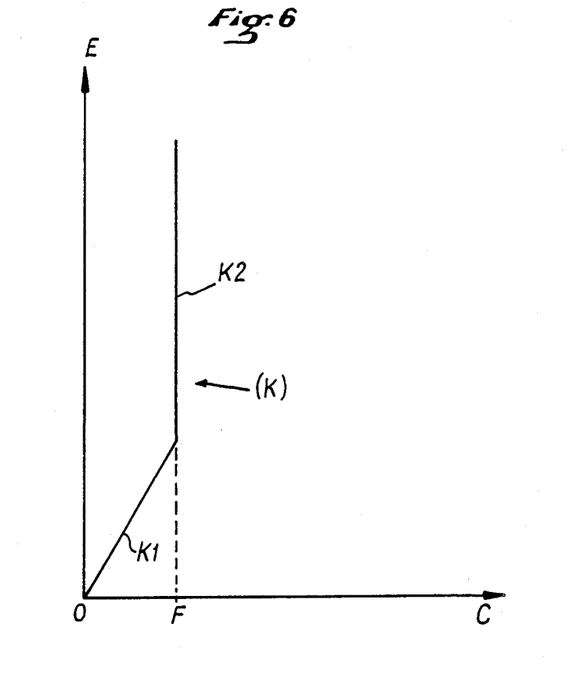
FIG. 6 is a diagram illustrating the compression (or retraction) E of the legs of FIGS. 3 to 5 as a function of the load C which is applied thereto.

FIG. 5 illustrates the situation in which one leg 10, 11 being in its position of extension with the tire 15 in abutment on the ground 35, undergoes a longitudinal (at least substantially vertical) load C, whilst FIG. 6 illustrates the curve K representative of the compression E as a function of said load C.

If load C is less than the force F (part K1 of curve K), the piston 24 remains in abutment against the bottom 26 of the jack 16 and only tire 15 is deformed.

On the other hand, if load C tends to become greater than force F (part K2 of curve K), the piston 24 rises inside said jack 16, constantly opposing a constant resistance equal to force F.

The hydraulic liquid is delivered into the supply line 30, through orifice 28 and valve 32.

If, in the case where load C being equal to force F, this load C varies rapidly about this value F, pistons 23 and 24 follow the variation in load, and the compressed gaseous fluid contained in the upper part 19A of the chamber 19 performs the role of a spring. The relief valve 33 allows the hydraulic liquid filling the space between the pistons 23 and 24 to escape via the return line 31, in the event of the flowrate through the supply line 30 not being sufficiently great.

If load C decreases from a situation for which it was equal to force F, the leg 10, 11 extends under the action of this constant force F until, if load C becomes less than force F, the piston 24 arrives in abutment against the bottom 26 of the jack 16. From this situation, only the tires deform to absorb load C.

Figure 7:
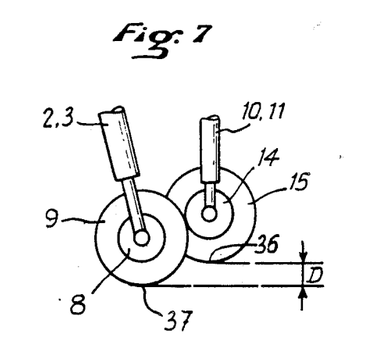
FIGS. 7 and 8 are two schematic views showing the relative positions of the wheels of the landing gears and of those of the legs according to the invention, respectively when no load is applied and when a load greater than a compression threshold of the landing gears is exerted thereon.

As shown in FIG. 7, when the landing gears 2, 3 and the legs 10, 11 (retracted) have extended, and when the aircraft 1 exerts no load on the landing gears, nor on said legs (which is for example the case when the aircraft 1 is in the air and is preparing to land), the lowermost point 36 of the wheel 14, 15 of the legs 10, 11 lies at a distance D above the lowermost point 37 of the wheels 8, 9 of the landing gears 2, 3.

Figure 8:
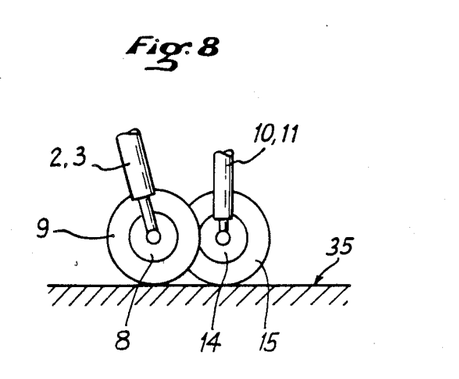

On the other hand (cf. FIG. 8), when the aircraft 1 is taxiing on the ground 35, for example after the impact of landing or before take-off, or when the aircraft 1 is resting on the ground 35 in stopped position, the wheel 14, 15 of the legs 10, 11 is in abutment on the ground, as are wheels 8, 9 of the landing gears 2, 3, further to the compression of the latter under the action of the load exerted thereon by said aircraft 1.

It goes without saying that the schematic structure of the legs 10, 11 given in FIGS. 3, 4 and 5 (merely intended to render the invention more readily understood) is not limiting. The legs 10, 11 may in particular be made in the form of jacks with annular chambers.

Figure 9:
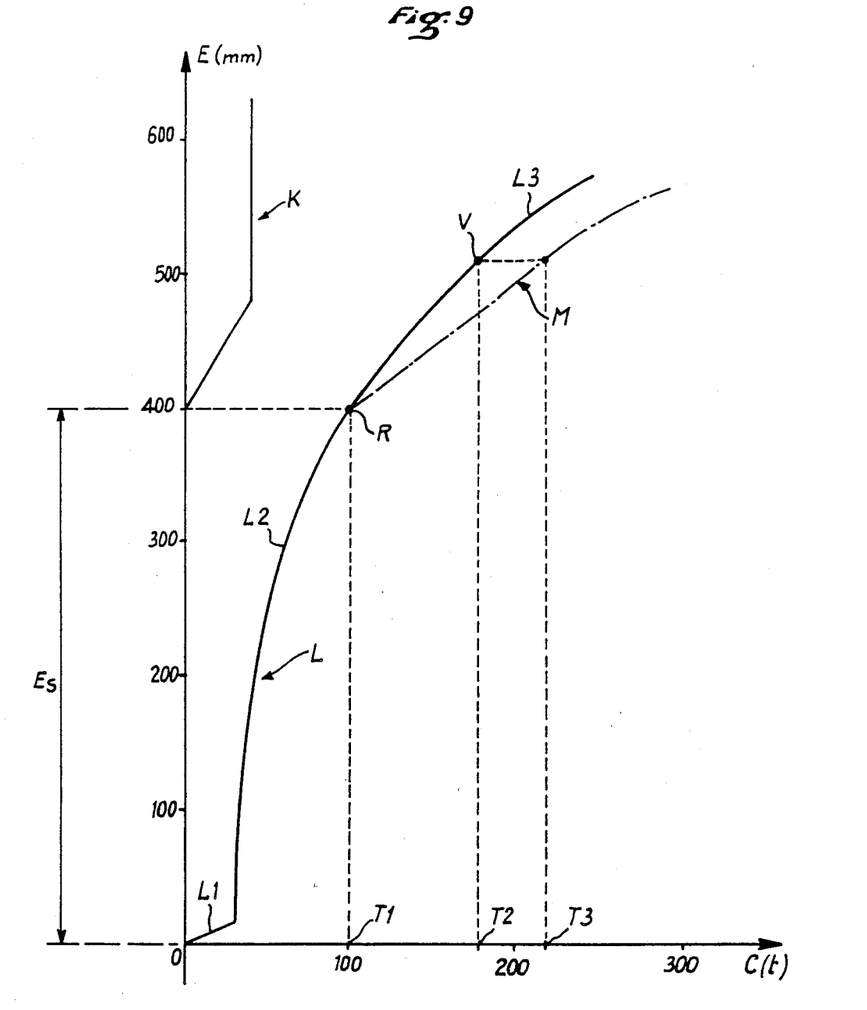
FIG. 9 is a diagram illustrating the principle of the present invention, representing the compression E (in mm) of the landing gears and of the legs of an experimental jumbo jet aircraft as a function of the load C (in tons) applied thereon.
Figure 10:
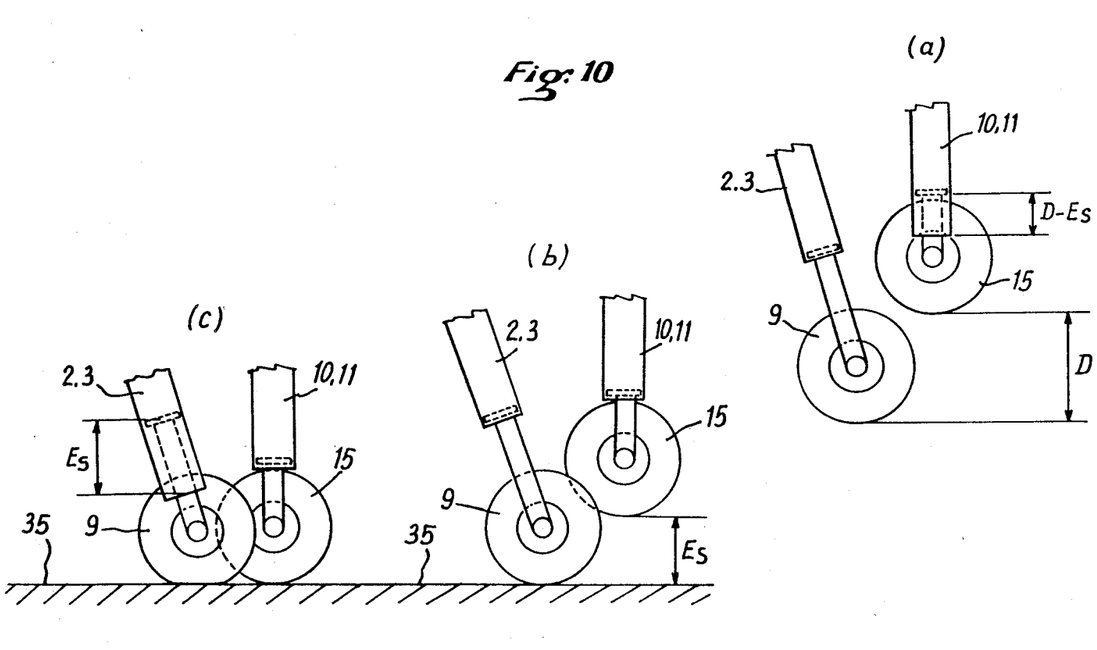

The diagram of FIG. 9, relative to an experimental aircraft, will clearly show the role of load-relief performed by the legs 10, 11 as the landing gears 2, 3 are loaded by the weight of the aircraft. The diagrams of FIG. 10 are associated with the diagram of FIG. 9.

This diagram shows, inter alia, the curve L illustrating the variation of compression E of the landing gears 2 and 3 alone as a function of the load C applied thereon.

When the load C is very low, only tires 9 are deformed, this being represented by part L1 of said curve L. On the other hand, when load C is high, the landing gears themselves retract, which corresponds to parts L2 and L3 of curve L having for example the parabolic appearance shown in FIG. 9.

FIG. 9 also shows the characteristic K of the legs 10, 11 and it has been assumed that said legs 10, 11 were capable of assisting the landing gears 2, 3 as soon as the load threshold T1 (corresponding to a compression Es) was attained (point R).

FIG. 10 illustrates the preferred operating mode of the rolling system according to the invention.

When the aircraft 1 is preparing to land (diagram a), the landing gears 2, 3 and the legs 10, 11 are in extended position; however, said legs 10, 11 are in retracted position (first position), i.e. the distance D separating the lowermost points 36 and 37 of the wheels 14, 15 and 8, 9 is greater than the compression Es corresponding to the load T1 and the retraction of legs 10, 11 is then equal to D-Es.

The instant the wheels 8, 9 of the landing gears 2, 3 touch the ground 35 (diagram b), the legs 10, 11 are extended (second position) and the distance separating the lowermost points 36 and 37 of the wheels 14, 15 and 8, 9 is, at that instant, equal to Es. The control of extension of legs 10, 11 is advantageously automatic and controlled by impact detectors mounted on the landing gears 2, 3.

Under the load exerted by the aircraft, the landing gears 2, 3 are compressed. Up to a load T1, only said landing gears 2, 3 compress in accordance with the positions of curves L1 and L2 of FIG. 9. From point R' (diagram c of FIG. 10), i.e. for a compression Es corresponding to the load threshold T1 of the landing gears 2, 3, the legs 10, 11 begin their function of load relief in accordance with the curve K. Curve M indicates the load supported by the assembly of the landing gears 2, 3 and the legs 10, 11 as a function of the compression E, whilst portion L3 of the curve L specifies the load that landing gears 2, 3 alone support.

FIG. 9 shows that at point V, for a load T3 greater than T2, the landing gears 2, 3 support only load T2, the legs 10, 11 then supporting the load T3-T2.

Although in FIGS. 1 and 2, two legs 10, 11 have been shown articulated beneath the fuselage, it goes without saying that these legs may be mounted beneath the wings 4, 5.

Moreover, the number of legs may be different, and one leg 10 only may for example be provided beneath the fuselage, disposed in the longitudinal plane of symmetry of the aircraft 1.

What is claimed is:

1. A rolling system for aircraft, comprising telescopic landing gears which abut on the ground via wheels and which present a variable length as a function of the load which is applied thereto by said aircraft;

wherein it comprises at least one jack assembly capable of outwardly pressing at least one rolling member having a constant force and said jack assembly is capable of communicating to said rolling member at least two relative positions of retraction with respect to the wheels of said telescopic landing gears, the first of these positions being such that such rolling member is maintained spaced apart from the ground wherever the compression of said telescopic landing gears under the load that is applied thereto by the aircraft, whilst the second of said positions is such that said rolling member is placed in contact with the ground when the length of said telescopic landing gears corresponds to a predetermined load threshold applied thereto, said threshold being less than the load corresponding to take-off;

wherein said jack assembly comprises a cylinder the cavity of which is provided with a projection separating said cavity into two communicating chambers, one of said chambers containing a piston provided with a rod opposite said projection and hermetically passing through the corresponding bottom of said cylinder, a first orifice for passage of fluid disposed in the vicinity of said projection and in simultaneous communication with the two communicating chambers, a second orifice in the vicinity of the bottom of said cylinder for passage of fluid disposed in said chamber containing said piston, and a line for supply of hydraulic fluid at constant pressure and a line for return of hydraulic fluid, capable of being alternately connected to said first and second orifices via a valve.

2. The system of claim 1, wherein said jack assembly provided with its rolling member forms a leg articulated beneath the fuselage or beneath the wings of the aircraft and adapted to occupy either a retracted position inside said fuselage or said wings, or an extended, at least substantially vertical position.

3. The system of claim 2, wherein said leg may take a retracted position and an extended position.

4. The system of claim 3, wherein, when said leg is both in extended position and in retracted position, when the aircraft rests on the ground in stopped position, the rolling member is distant from the ground.

5. The system of claim 3, wherein, when said leg is both in extended position and in position of extension and when no load is applied on the landing gears, the lowermost point of the rolling member of said leg lies, above the lowermost point of the wheels of the landing gears, at a distance corresponding to the compression thereof when said predetermined load threshold is applied thereto.

6. The system of claim 1, wherein said jack assembly comprises:
a jack of which the cavity of the cylinder is provided with a projection separating said cavity into two communicating chambers, one of said chambers containing a piston provided with a rod opposite said projection and hermetically passing through the corresponding bottom of said cylinder;
a first orifice for passage of fluid disposed in the vicinity of said projection and in simultaneous communication with the two communicating chambers;
a second orifice for passage of fluid disposed in said chamber containing said piston, in the vicinity of said corresponding bottom of said cylinder; and
a line for supply of hydraulic fluid at constant pressure and a line for return of hydraulic fluid, capable of being alternately connected to said first and second orifices via a valve.

7. The system of claim 6, wherein, in the other of said chambers of the cylinder, there is disposed a floating piston defining, between itself and the bottom of the cylinder opposite the bottom traversed by said piston rod, a tight enclosure which contains an elastically compressible gaseous fluid.

8. The system of claim 6, wherein a relief valve is disposed between said first orifice for passage of fluid and said fluid return line.

* * * * *